United States Patent [19]

Smith

[11] Patent Number: 5,542,638

[45] Date of Patent: Aug. 6, 1996

[54] BASE ASSEMBLY FOR USE WITH A SUSPENSION SYSTEM OF A VEHICLE SEAT

[75] Inventor: Rodney F. Smith, Seymour, Tenn.

[73] Assignee: National Seating Company, Vonore, Tenn.

[21] Appl. No.: 259,475

[22] Filed: Jun. 14, 1994

[51] Int. Cl.⁶ ................................................. F16M 13/00
[52] U.S. Cl. ...................... 248/421; 248/423; 297/344.16
[58] Field of Search ................................... 248/421, 423, 248/424, 370; 297/344.15, 344.16, 344.17

[56] References Cited

U.S. PATENT DOCUMENTS

| | | | |
|---|---|---|---|
| 2,302,387 | 11/1942 | Greeno et al. | 248/370 |
| 4,222,543 | 9/1980 | Gedig et al. | 248/421 X |
| 4,650,148 | 3/1987 | Sakamoto | 248/421 X |
| 4,784,434 | 11/1988 | Iwami | 297/344.16 X |
| 5,005,894 | 4/1991 | Nagata | 248/421 X |

FOREIGN PATENT DOCUMENTS

| | | | |
|---|---|---|---|
| 587920 | 5/1947 | United Kingdom | 248/421 |
| 774129 | 5/1957 | United Kingdom | 248/421 |

*Primary Examiner*—Alvin C. Chin-Shue
*Assistant Examiner*—Korie H. Chan
*Attorney, Agent, or Firm*—Michael E. McKee

[57] ABSTRACT

A base assembly for a suspension system of a vehicle seat utilizes lower and upper support frame and two pairs of elongated arms which are pivotally connected between the upper and lower support frames to accommodate forward and rearward movement (as well as upward and downward movement) of the upper support frame relative to the lower support frame. The arms act as parallel linkages during the movement of the upper support frame relative to the lower support frame and include broad abutment surfaces which engage one another when the upper support frame is moved forwardly relative to the lower support frame by a prescribed amount to thereby limit the forward movement of the upper support frame relative to the lower support frame. The abutment surfaces are relatively long in length in relation to the overall length of the arms and are bounded by tabs which interlock the arms together at the forward limit of travel of the upper support frame.

20 Claims, 2 Drawing Sheets

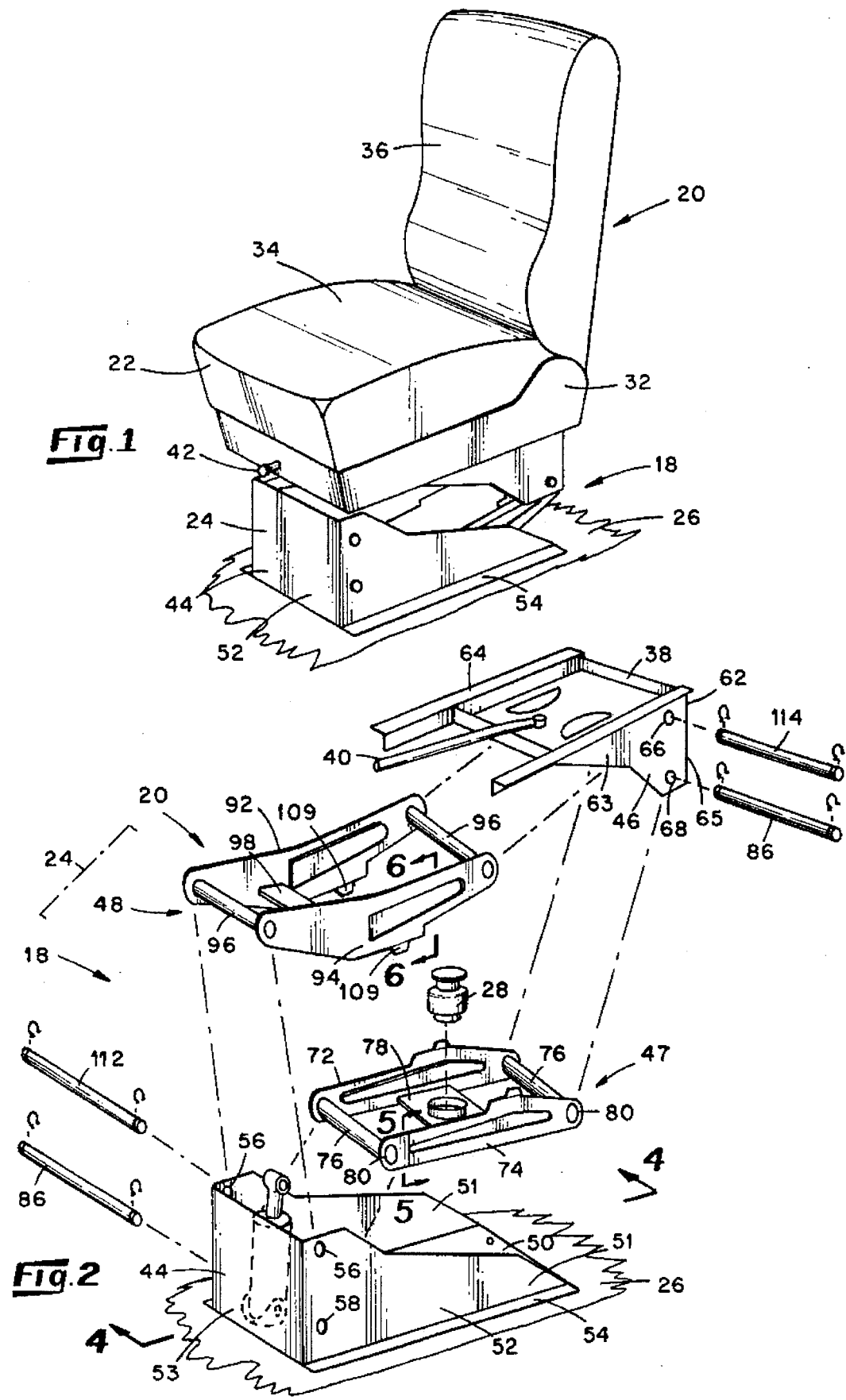

5,542,638

BASE ASSEMBLY FOR USE WITH A SUSPENSION SYSTEM OF A VEHICLE SEAT

BACKGROUND OF THE INVENTION

This invention relates generally to seats for vehicles and relates, more specifically, to the construction of a suspension system of a vehicle seat.

During the course of safety tests commonly performed upon a vehicle seat, the seat is exposed to relatively large forwardly-directed loading forces designed to simulate the effects of a vehicle collision. To limit the forward movement of the seat during such a test, a tether belt is commonly utilized to anchor the seat to the body of the vehicle. One such anchoring arrangement is shown and described in U.S. Pat. No. 3,890,002 wherein a tether, or seat, belt is secured at one end to a wall of a vehicle cabin and the other end of the belt is secured to a side of the seat frame.

It is an object of the present invention to provide new and improved means for limiting forwardly-directed, as well as upwardly-directed, movement of the seat during loading tests to which the vehicle seat may be exposed or during a vehicle collision.

Another object of the present invention is to provide such means which obviates the need for a tether belt for anchoring the seat to the body of the vehicle in which the seat is positioned.

Still another object of the present invention is to provide such means which is uncomplicated in construction and effective in operation.

SUMMARY OF THE INVENTION

This invention resides in a base assembly for a suspension system of a vehicle seat.

The base assembly includes lower support means securable in a stationary relationship with a vehicle body and upper support means arranged generally above the lower support means for supporting a user seated upon the vehicle seat. An arm assembly including a cooperating pair of elongated arms are each pivotally connected at its opposite ends to a corresponding one of the upper and lower support means so that the upper support means can be shifted generally upwardly and downwardly with respect to the lower support means. The cooperating arms include portions which are substantially vertically-aligned and which include relatively broad surfaces which move into abutting relationship with one another when the upper support means is shifted upwardly relative to the lower support means by a prescribed amount to thereby limit the upward movement of the upper support means relative to the lower support means.

In a particular embodiment of the invention, the cooperating arms include means for maintaining the vertically-aligned portions of the arms in vertical alignment when the vehicle seat is exposed to forces which urge the upper support frame upwardly relative to the lower support frame beyond its upper limit of movement.

BRIEF DESCRIPTION OF THE DRAWINGS

FIG. 1 is a perspective view of a vehicle seat within which a suspension system is utilized.

FIG. 2 is a perspective view of the base assembly of the suspension system of the FIG. 1 seat, shown exploded.

DETAILED DESCRIPTION OF THE ILLUSTRATED EMBODIMENT

Figure 3:
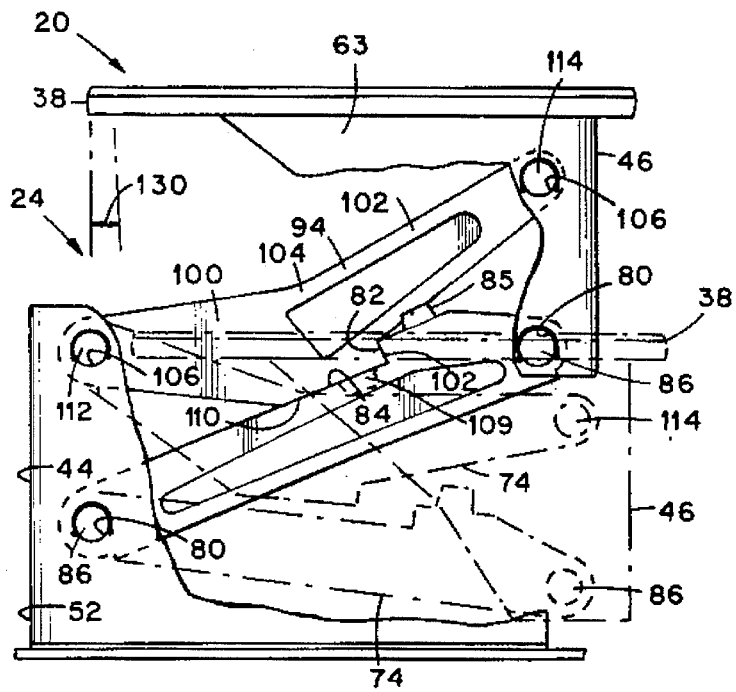
FIG. 3 is a side elevational view of a fragment of the FIG. 1 seat, shown partially cut-away.

Turning now to the drawings in greater detail and considering first FIG. 1, there is shown a vehicle seat assembly 20 in which a suspension system, generally indicated 18, embodying features of the present invention is utilized. The vehicle seat assembly 20 includes a vehicle seat 22, and the suspension system 18 includes a base assembly 24 upon which the seat 22 is supported for movement relative to the floor, indicated 26, of the vehicle along a generally vertical path. The suspension system 18 also includes an air spring 28 (FIGS. 2 and 4) and a shock absorber 30 (FIGS. 2 and 4) for dampening vertical oscillations of the seat 22 as the vehicle within which the seat assembly 20 is mounted is operated.

With reference again to FIG. 1, the seat 22 of the seat assembly 20 includes a frame 32 and a bottom cushion 34 and a back cushion 36 supported by the frame 32 in a conventional manner. The frame 32 is, in turn, supported upon a pan 38 (FIG. 2). In the depicted assembly 20, the pan 38 is incorporated within the base assembly 24 adjacent the upper end thereof. A spacing is provided between the bottom cushion 34 and the pan 38 to accommodate the routing of an air hose 40 (FIG. 2) between a valve 42 (FIG. 1) mounted adjacent the front of the seat 22 and the air spring 28. The upper end of the air spring 28 is secured beneath the pan 38 so that during spring operation, the top of the spring 28 acts against the underside of the pan 38.

With reference to FIG. 2, the base assembly 24 of the suspension system 18 is interposed between the frame 32 of the seat 22 and the vehicle floor 26 to accommodate movement of the seat 22 relative to the floor 26 between a raised condition and a lowered condition. To this end, the base assembly 24 includes lower support means 44 which is securable to the floor 26 in a stationary relationship therewith and upper support means 46 upon which the seat frame 32 is mounted. Pivotally connected between the upper and lower support means 44, 46 are lower and upper arm assemblies 47 and 48, respectively, described in greater detail herein. As the seat 22 is raised or lowered with respect to the vehicle floor 26, the upper support means 46 is raised or lowered with respect to the lower support means 44 as the arm assemblies are permitted to pivot relative to the upper and lower support means 46 and 44 as parallel linkages.

The lower support means 44 includes a generally horizontally-disposed base plate 50 and a support frame 52 having a generally U-shaped cross section, as viewed from above in FIG. 2, having a pair of legs 51 and a base section 53 spanning the space between the legs 51. The base plate 50 is attached along the lower edges of the frame 52 to enhance the rigidity of the lower support means 44, and the support frame 52 is arranged upon the vehicle floor 26 so that the U of its U-shape opens generally rearwardly (with respect to the seat 22) and so that each of its legs 51 is disposed adjacent a corresponding side of the seat 22. For enhancing the stability of the base assembly 24, the legs 51 are spaced relatively far apart, e.g. at least about 6.0 inches, so that the base assembly 24 spans an appreciable area of the vehicle floor 26. Flanges 54 having apertures therein are provided along the lower edges of the support frame 52 to facilitate securement of the support means 44 to the vehicle floor 26 with bolts or other suitable fasteners. Each leg 51 of the support frame 52 is provided with a pair of openings 56, 58 whose purpose will become apparent herein.

With reference still to FIG. 2, the upper support means 46 includes a support frame 62 having a generally U-shaped cross section, as viewed from above in FIG. 2, having a pair of legs 63 and a base section 65 extending between the legs 63. The pan 38 is platen in form and is attached between the legs 63 along the upper edges thereof so that the pan 38 is arranged substantially horizontally. The support frame 62 is arranged in a superposed relationship above the lower support 52 so that the U of its U-shape opens generally forwardly (with respect to the seat 22) and so that each of its legs 63 is disposed adjacent a corresponding side of the seat 22 and in substantially vertical registry with the legs 51 of the lower support frame 52. Flanges 64 having apertures therein are provided along the edges of the pan 38 to facilitate securement of the seat frame 32 to the pan 38 with bolts or other suitable fasteners. Each leg of the support 46 is provided with a pair of openings 66, 68 whose purpose will become apparent herein.

Figure 5:
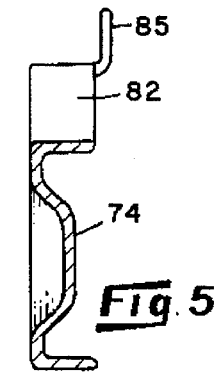
FIG. 5 is a cross-sectional view taken about along line 5—5 of FIG. 2.

The lower arm assembly 47 includes two elongated beams, or arms, 72 and 74 which are rigidly secured to one another in a substantially parallel relationship by means of a pair of sleeve-like bushings, or tubes, 76 and a platen-like bracket 78 which extends between the arms 72 and 74. Each arm 72 or 74 is formed of sheet steel (which may, for example, be ten, eleven or twelve gauge sheet steel) which has been formed so that its cross section resembles somewhat of a U-shaped channel, as shown in FIG. 5, whose U opens horizontally. Preferably, a rib is formed along the length of each arm 72 or 74 to enhance the strength and rigidity thereof. As exemplified by arm 74 in FIG. 3, each arm 72 or 74 is substantially linear in form as a path is traced between its ends, and an opening 80 is provided adjacent each of its ends. Defined along the upper edge of each arm 72 or 74 is a forwardly-directed shoulder 82, an upwardly-facing surface 84 adjacent the shoulder 82, and an upwardly-directed tab 85 whose purpose will become apparent herein.

With reference again to FIG. 2, each of the tubes 76 of the lower arm assembly 47 extends between the arms 72 and 74 adjacent a corresponding end thereof and are secured thereto, as by welding, to the arms 72 and 74 so that the opening of each tube 72 or 74 is aligned with the openings 80 provided at the corresponding ends of the arms 72, 74. The aligned openings of the tube 76 and arms 72 and 74 are sized to accommodate the insertion of a pivot pin 86 therethrough for pivotally securing the arms 72 and 74 to the upper and lower support frames 62 and 52 (by way of the openings 58 and 68 provided in the frames 52 and 62). Preferably, each pivot pin 86 is constructed of a high strength steel to resist shear forces to which the pin 86 may be exposed. The platen-like bracket 78 extends between and is secured, as by welding, to the arms 72 and 74 so that one of the side faces of the bracket 78 faces generally upwardly. As will be apparent herein, the lower end of the air spring 28 is secured to the bracket 78 so that during operation of the vehicle, the lower end of the spring 28 acts against the arms 72, 74 by way of the bracket 78.

Figure 6:
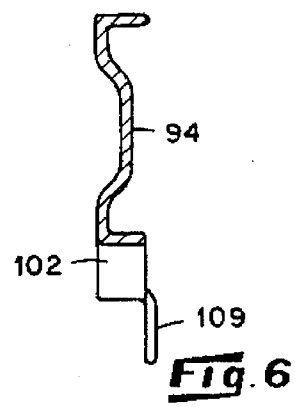
FIG. 6 is a cross-sectional view taken about along line 6—6 of FIG. 2.

The upper arm assembly 48 also includes two elongated beams, or arms, 92 and 94 which are rigidly secured to one another in a substantially parallel relationship by means of a pair of sleeve-like bushings, or tubes, 96 and a brace member 98 which extend between the arms 92 and 94. As are the arms 72 and 74, each arm 92 or 94 is formed of sheet steel (which may, for example, be ten, eleven or twelve gauge sheet steel) which has been formed so that its cross section resembles somewhat of a U-shaped channel, as shown in FIG. 6, whose U opens in a horizontal direction. Preferably, a rib is formed along the length of the arm 92 or 94 to enhance the strength and rigidity thereof. As exemplified by the arm 94 shown in FIG. 3, each arm 92 or 94 is somewhat V-shape in form as a path is traced between its ends so as to provide leg portions 100 and 102 which extend outwardly from an apex portion 104, and an opening 106 is provided adjacent each of its ends. Defined along the lower edge of each arm 92 or 94 (and along the leg portion 102) is a rearwardly-directed shoulder 108, a downwardly-facing surface 110 adjacent the shoulder 108, and a downwardly-directed tab 109 whose purpose will become apparent herein.

Figure 4:
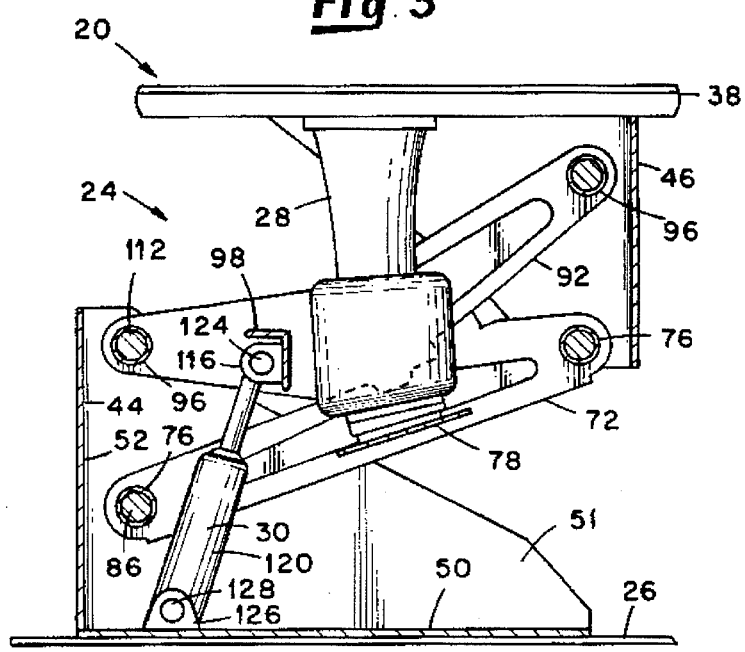
FIG. 4 is a cross-sectional view of the FIG. 3 fragment taken about along line 4—4 of FIG. 2.

With reference again to FIG. 2, each of the tubes 96 of the upper arm assembly 48 extends between the arms 92 and 94 adjacent a corresponding end thereof and are secured thereto, as by welding, to the arms 92 and 94 so that the opening of each tube 96 is aligned with the openings 106 provided at the ends of the arms 92, 94. The aligned openings of the tubes 96 and arms 92 and 94 are sized to accommodate the insertion of a pivot pin 112 or 114 therethrough for pivotally securing the arms 92 and 94 to the upper and lower support frames 62 and 52 (by way of the openings 56 and 66 provided in the frames 52 and 62). The brace member 98 is L-shaped in cross section (as best shown in FIG. 4) and extends between and is secured, as by welding, to the arms 92 and 94 so that one side of the L of the brace member 98 faces generally downwardly. A U-shaped bracket 116 (FIG. 4) is secured to the brace member 98 intermediate the ends thereof and includes a through-opening therein. As will be apparent herein, one end, i.e. the upper end, of the shock absorber 30 is secured to the bracket 116 so that during oscillations of the seat 22, the upper end of the shock absorber 30 acts against the arms 92, 94 by way of the brace member 98.

The air spring 28 of the suspension system 18 is a rolling-lobe class of spring whose construction and operating principles are described in U.S. Pat. No. 5,234,203, the disclosure of which is incorporated herein by reference. Accordingly, a detailed description of the construction of the spring 28 is not believed to be necessary. Suffice it to say that the spring 28 has one internal air chamber of fixed volume and a second internal air chamber of variable volume, and air is permitted to pass at a controlled rate between the two chambers to dampen the relative motion between the upper and lower ends of the spring 28 in an efficient manner. The lower end and upper end of the spring 28 is tightly secured to a corresponding one of the bracket 78 of the lower arm assembly 47 and the underside of the pan 38 with clamps or other suitable fasteners. Therefore, as the seat 22 is oscillated in response to vertically-induced vibrations, the spring 28, which is connected so as to act between the pan 38 and the lower arm pair 72 and 74, effectively cushions those seat oscillations.

As best shown in FIG. 4, the shock absorber 30 includes a cylinder 120 and ram 122 slidably positioned with the cylinder 120. Internal chambers within the shock absorber contain a hydraulic fluid, and internal regulating means within the shock absorber 30 control the flow of fluid between the internal chambers as the ram 122 is slidably moved relative to the cylinder 120 to thereby control the rate of movement therebetween. The upper end of the ram 122 is connected to the U-shaped bracket 116 by means of a pin 124, and the lower end of the cylinder 120 is connected to a second U-shaped bracket 126 which has been affixed atop the base plate 50 to thereby secure the cylinder 120 to the lower support means 44. When mounted within the base assembly 24 in the aforedescribed manner, the shock absorber 30 helps to dissipate the energy created by the vertical movement of the seat 22.

With the lower and upper arm assemblies 47 and 48 pivotally connected between the lower and upper support means 44 and 46 as aforedescribed, the upper support means 46 is permitted to move relative to the lower support means 44 between an uppermost position illustrated in solid lines in FIG. 3 and a lowermost position illustrated in phantom in FIG. 3. As the upper support means 46 moves downwardly relative to the lower support means 44 to its lowermost position, the ram 122 retracts within and bottoms out in the cylinder 120 of the shock absorber 30, and it is this bottoming out of the shock absorber 30 that limits the downward movement of the upper support means 46 relative to the lower support means 44. In this connection, the shock absorber 30 is sized so that the shock absorber 30 bottoms out before the upper support means 46 contacts the lower support means 44.

It is a feature of the arm assemblies 47 and 48 that they cooperate so as to limit the amount of movement of the upper support means 46 relative to the lower support means 44. To this end, the arms of the arm assemblies 47, 48 disposed on each side of the seat 20 (one arm pair including the arms 72 and 92, and the other arm pair including the arms 74 and 94) include portions which are substantially vertically aligned with one another so that upon raising the upper support means 46 by a prescribed amount, these vertically-aligned portions contact one another to prevent additional upwardly-directed movement. In this connection, the vertically-aligned portions include surfaces which are adapted to abut one another over a relatively broad or expansive area. In the interests of the present invention, the term "broad" means "wide" and is used to describe that the width of the area of contact (as measured between the sides of the seat) between the abutment surfaces is considerably greater than the width of narrow line of points which may contact one another along the length of the arms.

Moreover, the arm assemblies 47 and 48 are sized with respect to one another so that when the arms 72, 74 of the lower arm assembly 47 contact the arms 92, 94, the shoulders 82 of the arms 72, 74 abuttingly engage the shoulders 102 of the arms 92, 94 and the upper edge surface of the arms 72, 74 abuttingly engage the elongated surfaces 110. Each of the shoulders 82 and 102 includes a generally planar abutment surface which is arranged substantially perpendicular to the longitudinal axis of its arm wherein the longitudinal axis of an arm can be approximated by an imaginary line drawn between the ends of the arm. Therefore, when the shoulders 82 and 102 abut one another, these abutment surfaces of the shoulders 82 and 102 abut one another and serve to prevent any slip of the engaging arms relative to one another along the length of the arms.

In addition, the aforedescribed broad surface area of contact between the cooperating arms helps to resist additional upward movement of the upper support means 46 relative to the lower support means 44 beyond its upper limit of travel. In other words, if the upper support means 46 is exposed to upwardly-directed forces which urges the lower arms 72 and 74 against the underside of the upper arms 92 and 94, this broad surface area helps to prevent the lower arms from slipping past the upper arms and thereby helps to maintain the engaging arms in vertical alignment. In the depicted embodiment, the abutting surfaces of the arms are about 0.5 inches in width and the length of the arm surface 110 (along which each arm 92 or 94 engages its cooperating arm 72 or 74) is at least about 5.0 inches.

Figure 7:
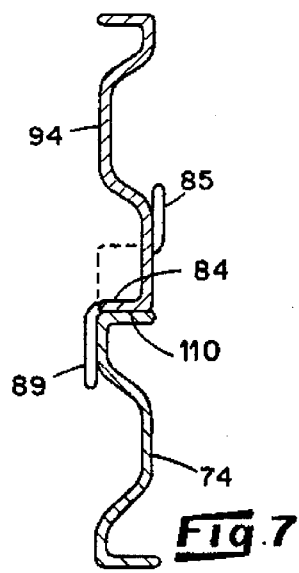
FIG. 7 is a cross-sectional view similar to that of FIG. 5 illustrating a pair of cooperating arms when positioned in abutting relationship.

As exemplified by the cooperating arms 74 and 94 illustrated in FIG. 7, the tabs 85 and 109 which are associated with the arms are positioned on opposite sides of the vertically-aligned portions of the arms when the vertically-aligned portions thereof are in engagement with one another (and the upper support means 46 is positioned in its upper limit of travel). This tab arrangement interlocks the vertically-aligned portions of the arms to one another so that the interlocked arms act as a single beam to resist lateral shifting of the arms relative to one another.

It will be understood that as the upper support means 46 is moved from its lower position of travel, as illustrated in phantom in FIG. 3, to its upper position of travel, as illustrated in solid lines in FIG. 3, the upper support means 46 shifts forwardly from a rearward limit of travel to a forward limit of travel which is situated a distance 130 forwardly of the rearward limit of travel. During loading tests performed upon the seat 20, the seat 20 is exposed to relatively large forwardly-directed forces, and these forwardly-directed forces shift the upper support means 46 toward its uppermost limit of travel as the upper support means 46 is urged forwardly. The aforedescribed cooperation between the arms of the lower and upper arm assemblies 47 and 48, i.e. the engaging surfaces of the vertically-aligned portions of the arms and the interlocking tabs, which prevent upward movement of the upper support means 46 beyond its upper limit of travel also prevent additional forward movement of the upper support means 46 relative to the lower support means 44 beyond the aforedescribed forward limit of travel.

It can also be appreciated that when forces urge the upper support means 46 forwardly (or upwardly) relative to its uppermost limit of travel, the arms 92, 94 of the upper arm assembly 48 are in compression while the arms 72, 74 of the lower arm assembly 47 are in tension. This being the case, the ribs formed along the sides of the cooperating arms, in conjunction with the interlocking tab arrangement, reduce the likelihood that the engaging arms will experience buckling or similar deformation when exposed to compression and/or tension forces.

During load tests performed upon the seat 20, the seat 20 has been found capable of withstanding large forwardly-directed forces without appreciable deformation. Just as significant is the fact that the seat 20 is capable of withstanding extreme loading tests without the use of a tether belt (as is described and shown in U.S. Pat. No. 3,890,002) used for anchoring the seat 20 to the body of the vehicle. Accordingly, the seat 20 obviates the need for a tether belt and is advantageous in that manufacturing and vehicle assembly costs can thereby be reduced.

It will be understood that numerous modifications and substitutions can be had to the aforedescribed embodiment without departing from the spirit of the invention. For example, although the seat 20 has been described as having two sets of cooperating pairs of arms, i.e. one set including arms 72 and 92 and the other set including arms 74 and 94, a seat in accordance with the broader aspects of the invention may have an alternative number of cooperating arms, such as one, three or four. Accordingly, the aforedescribed embodiment is intended for the purpose of illustration and not as limitation.

I claim:

1. A base assembly for a suspension system of a vehicle seat including:

lower support means securable in a stationary relationship with a vehicle body;

upper support means arranged generally above the lower support means for supporting a user seated upon the vehicle seat;

an arm assembly including a cooperating pair of elongated arms which are each pivotally connected at its opposite ends to a corresponding one of the upper and lower support means so that the upper support means can be shifted generally upwardly and downwardly with respect to the lower support means; and the cooperating arms including portions which are substantially vertically aligned with one another as the upper support means is shifted upwardly and downwardly as aforesaid, and the vertically-aligned portions include relatively broad surfaces which move into abutting relationship with one another when the upper support means is shifted upwardly relative to the lower support means by a prescribed amount to thereby limit the upward movement of the upper support means relative to the lower support means, and wherein the relatively broad surfaces include elongated flat surfaces which extend for an appreciable distance along length of each arm so that upon movement of the relatively broad surfaces into abutting relationship with one another, the broad surfaces engage one another over an appreciable distance along the length of each arm.

2. The base assembly as defined in claim 1 wherein the cooperating arms are joined between the upper and lower support means to accommodate a shifting of the upper support means forwardly and rearwardly relative to the lower support means as the upper support means is shifted upwardly and downwardly as aforesaid, and the broad surfaces are adapted to limit the forward travel of the upper support means relative to the lower support means when moved into abutting relationship with one another.

3. The base assembly as defined in claim 1 wherein each arm includes a shoulder having a surface which is oriented in a plane arranged substantially perpendicular to the longitudinal axis of the arm and which is adapted to move into abutting relationship with the shoulder surface of the other of the cooperating arms when the upper support means is moved to its upward limit of movement.

4. The base assembly as defined in claim 1 wherein the width of the broad surface portions is at least about 0.5 inches.

5. The base assembly as defined in claim 1 wherein the vertically-aligned portions of each elongated arm is channel-shaped in cross section to enhance the strength and rigidity of the arm.

6. The base assembly as defined in claim 1 wherein the cooperating arms include means for maintaining the vertically-aligned portions of the arms in vertical alignment when the vehicle seat is exposed to forces which urge the upper support means beyond its upward limit of movement.

7. The base assembly as defined in claim 6 wherein the maintaining means includes a tab joined to the vertically-aligned portion of at least one of the cooperating arms and is positioned alongside the vertically-aligned portion of the other arm when the upper support means is positioned at its upward limit of movement to rigidify the cooperating arms when the broad surfaces thereof are positioned in abutting relationship.

8. The base assembly as defined in claim 7 wherein each of the elongated arms includes a tab joined to its vertically-aligned portion so that when the upper support means is positioned at its upward limit of movement, the tab of one arm is disposed on the opposite side of the vertically-aligned portions from the tab of the other arm.

9. The base assembly as defined in claim 1 wherein the cooperating arms is a first pair of arms and the base assembly further includes a second cooperating pair of arms which are each pivotally connected at its opposite ends to a corresponding one of the upper and lower support means for accommodating the raising and lowering of the upper support means relative to the lower support means as aforesaid; and the first and second pair of arms are arranged in substantially parallel planes and are disposed on opposite sides of the seat from one another.

10. A base assembly for a suspension system of a vehicle seat comprising:

a lower support frame securable in a stationary relationship with respect to a vehicle body;

an upper support frame arranged in a superposed relationship above the lower support frame;

two sets of parallel arms pivotally connecting the upper and lower support frames to one another, each arm being elongated in shape and being pivotally joined at one of its ends to the upper support frame and being pivotally joined at the other of its ends to the lower support frame to accommodate movement of the upper support frame relative to the lower support frame relative between upper and lower limits of travel; and the arms of each set including portions which are vertically aligned with one another as the upper support means is moved between its upper and lower limits of travel, and the vertically-aligned portions include abutment surfaces which abut one another when the upper support frame is moved to its upper limit of travel to thereby limit the upward movement of the upper support frame relative to the lower support frame; and the elongated arms of each set include means for maintaining the vertically-aligned portions of the arms in vertical alignment when the vehicle seat is exposed to forces which urge the upper support frame upwardly relative to the lower support frame beyond its upper limit of movement.

11. The base assembly as defined in claim 10 wherein the arms of each arm set are joined between the upper and lower support frame to accommodate a shifting of the upper support frame forwardly and rearwardly relative to the lower support frame as the upper support frame is moved upwardly and downwardly as aforesaid, and the abutment surfaces are adapted to limit the forward shifting of the upper support frame relative to the lower support frame when the abutment surfaces are moved into abutting relationship with one another.

12. The base assembly as defined in claim 10 wherein the arm of each set includes a shoulder having a surface which is oriented in a plane arranged substantially perpendicular to the longitudinal axis of the arm to which is joined and which is adapted to move into abutting relationship with the shoulder surface of the other arm of the set when the upper support frame is moved to its upper limit of movement.

13. The base assembly as defined in claim 10 wherein the abutment surfaces include expansive surface portions which extend for an appreciable distance along the length of each arm of a set, and the width of the expansive surface portions is at least about 0.5 inches.

14. The base assembly as defined in claim 10 wherein the vertically-aligned portions of each elongated arm is channel-shaped in cross section to enhance the strength and rigidity of the arm.

15. The base assembly as defined in claim 10 wherein the maintaining means includes a tab joined to the vertically-aligned portion of at least one arm of a set and is positioned alongside the vertically-aligned portion of the other arm of the set when the upper support frame is positioned at its upper limit of movement to rigidify the arms when the abutment surfaces thereof are positioned in abutting relationship.

16. The base assembly as defined in claim 15 wherein each of the arms includes a tab joined to its vertically-aligned portion so that when the upper support frame is positioned at its upper limit of movement, the tab of one arm of one set is disposed on the opposite side of the vertically-aligned portions from the tab of the other arm of the one set.

17. The base assembly as defined in claim 10 wherein the two sets of arms are arranged in substantially parallel planes and are disposed on opposite sides of the seat from one another.

18. In combination, a vehicle seat having a cushion-supporting frame and a base assembly interposed between the cushion-supporting frame and a body of a vehicle, the base assembly including:

a lower support frame securable in a stationary relationship with a vehicle body;

an upper support frame arranged generally above the lower support frame and upon which the cushion-supporting frame is secured;

a cooperating pair of elongated arms which are each pivotally connected at its opposite ends to a corresponding one of the upper and lower support frame so that the upper support frame can be shifted upwardly and downwardly with respect to the lower support frame as the elongated arms act as parallel linkages joining the upper and lower support frame; and the cooperating arms including portions which are substantially vertically aligned with one another as the upper support frame is shifted upwardly and downwardly as aforesaid, and the vertically-aligned portions include relatively expansive surfaces which abut one another when the upper support frame is shifted upwardly relative to the lower support frame by a prescribed amount to thereby limit the upward movement of the upper support frame relative to the lower support frame.

19. The base assembly as defined in claim 18 wherein each of the cooperating arms are joined between the upper and lower support frames to accommodate a shifting of the upper support frame forwardly and rearwardly relative to the lower support frame as the upper support frame is shifted upwardly and downwardly as aforesaid, and the expansive surfaces are adapted to limit the forward shifting of the upper support frame relative to the lower support frame when the expansive surfaces are moved into abutting relationship with one another.

20. The base assembly as defined in claim 18 wherein each of the cooperating arms includes a shoulder having a surface which is oriented in a plane arranged substantially perpendicular to the longitudinal axis of the arm to which it is joined and which is adapted to move into abutting relationship with the shoulder surface of the other of the cooperating arms when the upper support frame is moved to its upward limit of movement.

* * * * *